United States Patent
Humphrey

(10) Patent No.: US 9,001,974 B2
(45) Date of Patent: Apr. 7, 2015

(54) SYSTEM FOR PROVIDING TELEPHONY AND DATA SERVICES

(75) Inventor: Leslie Derek Humphrey, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 13/988,941

(22) PCT Filed: Nov. 23, 2011

(86) PCT No.: PCT/GB2011/001642
§ 371 (c)(1),
(2), (4) Date: May 22, 2013

(87) PCT Pub. No.: WO2012/069788
PCT Pub. Date: May 31, 2012

(65) Prior Publication Data
US 2013/0251114 A1 Sep. 26, 2013

(30) Foreign Application Priority Data

Nov. 23, 2010 (EP) .................................... 10251987

(51) Int. Cl.
| H04M 1/24 | (2006.01) |
| H04M 3/08 | (2006.01) |
| H04M 3/22 | (2006.01) |
| H04M 9/08 | (2006.01) |
| H04M 1/00 | (2006.01) |
| H04M 1/738 | (2006.01) |

(Continued)

(52) U.S. Cl.
CPC ................ *H04M 3/22* (2013.01); *H04M 1/738* (2013.01); *H04M 1/82* (2013.01); *H04M 11/066* (2013.01); *H04M 19/08* (2013.01)

(58) Field of Classification Search
USPC ......... 379/1.01, 1.03, 1.04, 22.07, 23, 24, 30, 379/387.01, 413.02, 413.03, 413.04
See application file for complete search history.

(56) References Cited

U.S. PATENT DOCUMENTS 4,103,112 A * 7/1978 Korsky .......................... 379/378
4,815,124 A * 3/1989 Bowers et al. ................. 379/237

(Continued)

FOREIGN PATENT DOCUMENTS

| EP | 0 600 644 A1 | 6/1997 |
| EP | 1 009 156 A2 | 6/2000 |

(Continued)

OTHER PUBLICATIONS

Application and File history for U.S. Appl. No. 13/821,923, filed Mar. 8, 2013, Inventor: Leslie Derek Humphrey.

*Primary Examiner* — Binh Tieu
(74) *Attorney, Agent, or Firm* — Patterson Thuente Pedersen, P.A.

(57) ABSTRACT

A telephone on-hook/off-hook state communication system. The system includes a first part, for example in the form of an In-Line Analog POTS presentation Adapter, which is operable to interconnect between a telephone apparatus and a pair of conductors, and a second part operable to interconnect between the pair of conductors and a telephone adapter unit, the first part including a variable impedance and means for changing the impedance of the variable impedance such that a property of the impedance at a predetermined frequency (f) greater than zero changes in response to the telephone apparatus transitioning between an on-hook state and an off-hook state, the second part including a detector for detecting the change in the impedance of the variable impedance of the first part via the pair of conductors.

8 Claims, 4 Drawing Sheets

(51) Int. Cl.
*H04M 1/82* (2006.01)
*H04M 11/06* (2006.01)
*H04M 19/08* (2006.01)

(56) References Cited

U.S. PATENT DOCUMENTS

| | | | |
|---|---|---|---|
| 5,473,676 A | 12/1995 | Frick | |
| 5,848,150 A * | 12/1998 | Bingel | 379/399.01 |
| 6,269,154 B1 * | 7/2001 | Chellali et al. | 379/93.28 |
| 6,522,730 B1 * | 2/2003 | Timm et al. | 379/93.08 |
| 6,563,864 B1 * | 5/2003 | Ibrahim et al. | 375/222 |
| 6,563,924 B1 * | 5/2003 | Cho | 379/399.01 |
| 6,671,373 B1 * | 12/2003 | Pang et al. | 379/399.01 |
| 6,724,890 B1 * | 4/2004 | Bareis | 379/394 |
| 6,813,343 B1 * | 11/2004 | Vitenberg | 379/93.05 |
| 7,317,793 B2 * | 1/2008 | Binder et al. | 379/413 |
| 7,580,732 B2 * | 8/2009 | Bailey | 455/572 |
| 7,702,095 B2 * | 4/2010 | Binder et al. | 379/413 |
| 8,107,618 B2 * | 1/2012 | Binder et al. | 379/413 |
| 2003/0179818 A1 | 9/2003 | D'Angelo | |
| 2004/0151305 A1 | 8/2004 | Binder et al. | |
| 2004/0179662 A1 * | 9/2004 | Bremer et al. | 379/93.01 |

FOREIGN PATENT DOCUMENTS

| | | |
|---|---|---|
| EP | 1 079 589 A2 | 2/2001 |
| FR | 2 896 935 A1 | 8/2007 |
| FR | 2 933 835 A1 | 1/2010 |
| GB | 2 445 212 A | 7/2008 |
| WO | WO 01/06751 A1 | 1/2001 |
| WO | WO 2005/043880 A1 | 5/2005 |
| WO | WO 2008/132428 A1 | 11/2008 |

* cited by examiner

SYSTEM FOR PROVIDING TELEPHONY AND DATA SERVICES

RELATED APPLICATIONS

The present application is a National Phase entry of PCT Application No. PCT/GB2011/001642 filed Nov. 23, 2011, which application claims the benefit of priority to EP Patent Application No. 10251987.3, filed Nov. 23, 2010, the entire disclosures of which are incorporated herein by reference.

FIELD OF THE INVENTION

The present invention relates to a system for providing telephony and data services, especially within a customer premises (e.g. a domestic consumer home), and most particularly where the data service operates over a high speed Digital Subscriber Line (DSL) connection, such as, for example, a DSL connection operating in accordance with one of the Very high speed DSL (VDSL) standards.

BACKGROUND

High speed DSL systems such as VDSL systems require the DSL connection (i.e. the part of the connection over copper cables) to be as short as possible in order to provide the fastest connections. It has therefore been proposed to place DSL modems at the network side (network modems) at so called "drop points". Such drop points might typically, for example, be at the top of a telegraph pole from where a number of telephone lines fan out each heading towards a different house. Such a point is likely to be the final distribution point before the external cable reaches the customer's premises.

In such situations it can be difficult for the network modem at the distribution point to obtain a reliable power supply from its immediate vicinity. Solutions have therefore been devised by which power is supplied from the consumer's premises over the copper pair connection together with the DSL signals.

In such scenarios normal telephony is normally provided by a Voice Over Internet Protocol (VOIP) solution. Generally, to provide this VOIP solution, the DSL modem in the customer's premises is configured to provide a socket (or jack) into which a conventional lead, having a conventional plug (e.g. a Registered Jack (RJ) 11 or 45 plug or a conventional BT plug (BS6312 431A plug), etc.) from a conventional telephone apparatus may be plugged. The modem (by means of a module referred to as an Analog Telephone Adapter (ATA)) simulates all of the Plain Old Telephone System (POTS) functionality generally provided by a conventional master socket which provides the interface between the customer's premises and the access network such that the telephone (for example an analog telephone) can operate normally as though it were directly connected to the master socket (e.g. a conventional British Telecommunications (BT) Network Termination Equipment (NTE) 5 model) or an extension socket correctly connected to the master socket.

However, when a telephone is connected directly to the user modem in this way, it becomes difficult for a user to use any existing extension telephone wiring (e.g. to extension sockets) for connecting additional telephones in locations which may be considerably removed from the user's modem. Co-pending European patent application No. EP10251572.3 filed on 10 Sep. 2010 describes a solution to this problem which requires at least three wires to be present in the user's extension wiring.

SUMMARY

According to a first aspect of an embodiment of the present invention, there is provided a telephone on-hook/off-hook state communication system comprising a first part operable to interconnect between a telephone apparatus and a pair of conductors and a second part operable to interconnect between the pair of conductors and a telephone adapter unit, the first part including a variable impedance and means for changing the impedance of the variable impedance such that a property of the impedance at a predetermined frequency greater than zero changes in response to the telephone apparatus transitioning between an on-hook state and an off-hook state, the second part including a detector for detecting the change in the impedance of the variable impedance of the first part via the pair of conductors.

Preferably the first part is in the form of an adapter unit having a port into which a conventional telephone jack may be inserted and including a line which may be connected into another telephone port/socket (e.g. within a modem/hub/ATA or just a port into a telephone socket (e.g. a master socket or a home wiring extension socket) (alternatively another socket could be provided into which a double ended telephone cable can be connected at one end, the other end being inserted into a telephone port/socket as before); such an adapter unit can thus be made to include a micro-filter (such as those in common usage in DSL environments such as in the UK) and can look and operate (from a user's perspective) similarly to such micro-filters. The first part thus needs to include a sensor means which can detect based solely on the electrical properties of the telephone which can be detected via the incoming cable from the conventional telephone that the telephone has gone off hook. A preferred way of doing this is to detect the change in resistance at DC by detecting the level of current flowing through the two conductors of the telephone cable where a dc voltage is applied across the two conductors. This is basically what occurs in a conventional system at the moment except that in embodiments of the present invention it is done in the adapter unit rather than at the exchange (as is done in a conventional telephone system) or at the ATA (as would typically be done in a normal pure VOIP solution). In the embodiments described below it cannot be done at the ATA because the change in current associated with the telephone going off hook would be hard to detect because of the much larger current consumption occurring at the exchange/drop point/other network side location distant from the user's premises (e.g. by the mini-DSLAM located there) because of the reverse power feed from the user's premises to the exchange/drop point/other network side location which reverse power is necessarily travelling over the same copper pair (because there is only one copper pair being used—either because the ATA is to be placed at, for example a drop point, outside of the user's premises and there is only a single copper pair leading out of the user's premises or because the user's premises only has a single pair carrying telephony signals through/within the premises).

In the appended claims (in particular, but also occasionally in the following description), in order to avoid confusion between the adapter unit which preferably forms the first part of the system of the present invention and the telephone adapter unit which preferably converts between analog telephony signals for use by a conventional telephone apparatus and digital signals for transmission as VoIP signals, the former adapter unit (i.e. which preferably forms the first part and a preferred embodiment of which is referred to below as an In-Line Analog POTS presentation Adapter) may be referred to as an interface device.

The lead between the telephone apparatus and the interface device preferably includes at least two conductors. In most preferred embodiments, it actually includes three wires one of which is the bell wire used by the telephone apparatus to detect a ringing signal.

The pair of conductors may be (at least in part) a pair of wires within a user's extension wiring cables (i.e. within the user's residence) or the pair of conductors may be the A and B wires of a drop wire pair (connecting between the user's premises (in particular at a network termination equipment box/device) and the first distribution point from the user's residence in the access network such as, for example, a drop point (e.g. on a telegraph pole)), or a combination of both internal extension wiring and a drop pair. The two different scenarios (ATA in the user's modem device and ATA in the network) associated with these two different cases are discussed below.

Preferably the detector comprises means for detecting a change in alternating current flowing through the detector and or a change in voltage drop across the impedance (in the case of a controlled current signal generator) resulting from the change in impedance of the variable impedance of the first part. In such a case, the system needs to include a signal generator for generating an alternating current/voltage signal which results in an alternating current which flows through the pair of conductors, the variable impedance and the detector and whose magnitude (e.g. of the current signal in the case of a controlled voltage generator, or of voltage in the case of a controlled current generator, etc.) depends upon the impedance of the variable impedance. This signal generator may form part of the detector itself. Furthermore, the detector may conveniently be incorporated into the telephone adapter.

Preferably, the variable impedance comprises a circuit containing some mostly resistive elements and some mostly reactive elements (e.g. capacitors and inductors) and varying the impedance is performed by switching a reactive component into or out of the circuit which comprises the variable impedance and thus varying the reactance (and therefore also the impedance) of the circuit. Note that in theory there is no such thing as a variable impedance since impedance is only defined for complex exponentials for $-\infty < t < +\infty$ and thus if the complex exponential voltage-current ratio changes over time or amplitude, the circuit element cannot be described using the frequency domain. However, many systems (e.g., varicaps that are used in radio tuners) may exhibit non-linear or time-varying voltage-current ratios that appear to be linear and time invariant for small signals over small observation windows; hence, they can be roughly described as having a time-varying impedance and this is the sense in which it is used in the present application.

Preferably, a controlled voltage signal generator is used in which the voltage signal is controlled to vary in a periodic manner with a given approximately fixed amplitude and root mean square value over time, which varies only slightly as the amount of power drawn from the generator varies. A transformer can then be used as the detector in which the primary winding is in series with the variable impedance and both are driven by the signal generator. When the impedance of the variable impedance at the driven frequency is relatively low then a higher signal will be transferred from the primary winding to the secondary winding than when the variable impedance has a relatively higher impedance. This signal can be rectified and low-pass filtered to derive an output voltage which depends upon the impedance of the variable impedance and can be used to switch a comparator to provide an on-off signal to the telephone adapter to indicate whether or not the telephone connected to the variable impedance is off-hook or on-hook.

The telephone adapter unit is operable to play the part normally played by a local exchange, in terms of generating and correctly responding to POTS signals required for the correct operation of an analog telephone device or one which emulates such a device. The telephone adapter can be any known telephone adapter which is operable to convert Plain Old Telephone Service (POTS) signals to and from Voice over Internet Protocol (VOIP) signals for transmission over a packet based network (e.g. the Internet). Such telephone adapters, often referred to as Analog Telephone Adapters (ATA's), are typically used to enable an analog telephone to operate in an environment where a user's connection to an access network only carries Digital Subscriber Line (DSL) signals. Another situation in which they are used is in a Fiber To The Cabinet (FTTC) scenario in which a telephone adapter is provided in the cabinet or in a Fiber To The Distribution Point (FTTDP) scenario in which a telephone adapter is provided in a distribution point such as a drop point (e.g. at (the top of) a telegraph pole) and (in both scenarios) the POTS signals are converted into a digital format for transmission over the fiber connection between the cabinet (in the case of FTTC) or the distribution point (in the case of FTTDP) and the local exchange. The present invention is applicable to all such situations.

The present invention enables the on-hook/off-hook status of a telephone device to be detected by a telephone adapter unit (e.g. an ATA) even in a situation where the pair of conductors used to interconnect the telephone device and the telephone adapter unit are carrying reverse power between the user's residence and equipment located within the access network (e.g. at a street cabinet, or at a distribution point such as a drop point, etc.). There are two principal scenarios in which this situation may arise, as discussed above.

The first principal scenario is where the telephone adapter unit is associated with a DSL modem device (e.g. BT's Home Hub) and POTS signals are converted by the telephone adapter unit into a form suitable for transmission over a DSL connection between the user's residence and a network side DSL modem located somewhere in the network (e.g. at a street cabinet or a drop point)—thereafter the telephone signals may be carried through the rest of the access network and any subsequent core and/or access networks in a digital and/or analog form in a conventional manner until arriving at the destination telephone device.

The second principal scenario is where the telephone adapter unit is located in the network, for example in association with a network side DSL modem (forming the network side modem of a DSL connection between a user's DSL modem and the network side DSL modem via a copper pair connection forming part of the legacy access network).

Embodiments of the present invention can be thought of as transforming the DC signal conventionally generated when a telephone device changes state from an on-hook state to an off-hook state into a different domain. Since the reverse power feed is normally supplied as a DC voltage, by transforming the DC on hook/off hook signal to a different domain to that of the reverse power feed it avoids interference between the on hook/off hook signal and the reverse power feed. In the present invention the different domain is a non-DC domain (i.e. at some predetermined non-zero frequency). In comparison, co-pending European patent application EP10251572.3 can be thought of as transforming the DC signal (together with all other POTS signals) from one physical pair of conductors (copper wires) to another.

A significant advantage of embodiments of the present invention (over for example EP10251572.3) is that it can be used in the second principal scenario described above where the telephone adapter unit is located in the network, because in that case there is not usually a spare conductor (a third wire) as is required by the invention of EP10251572.3, since the copper pair which goes to a user's residence from outside normally only contains the two conductors forming the copper pair (the "drop wire"). Note this contrasts with typical extension wiring inside a user's premises which usually has at least three conductors available if not four, at least in the UK.

As mentioned, this system is most useful for enabling a reverse power feed solution, and therefore, preferred embodiments further include a reverse power means for providing a DC power supply which can be drawn by a device in the network connected to the drop wire pair of conductors attached to the user's residence. This is conveniently provided as part of the user's side DSL modem device.

The first part may be formed as an In-Line Analog POTS presentation Adapter (ILAPA). Multiple such ILAPA's may be used in a user's residence for each conventional telephone device (or telephone-like device—e.g. a fax machine) connected to the user's extension wiring system. Smarter installations might include parts of the home telephony network isolated from that part carrying DSL signals by a single ILAPA which converts the whole analog part of the home network, but such solutions would be considerably less straightforward to retrofit by a typical user.

According to a second aspect of an embodiment of the present invention, there is provided an In-Line Analog POTS presentation Adapter (ILAPA) for use in the system of the first aspect of the present invention as a first part thereof, the in-line adapter (ILAPA) being operable to interconnect between a telephone apparatus and a pair of conductors to which a second part of the system of the first aspect of the present invention may be connected, the second part being operable to interconnect between the pair of conductors and an analog telephone adapter unit, the in-line adapter (ILAPA) including a variable impedance and means for changing the impedance of the variable impedance at a predetermined frequency greater than zero by an amount which is detectable by the second part, the change in impedance being effected in response to the telephone apparatus transitioning between an on-hook state and an off-hook state.

According to a third aspect of embodiments of the present invention, there is provided a telephone adapter device, which device is suitable for use in a system according to the first aspect of the present invention as the second part thereof, the telephone adapter device being operable to connect to a pair of conductors which in turn may be connected, when in use, to an in-line analog POTS presentation adapter forming a first part of the system of the first aspect described, the in-line adapter being in turn connectable to a telephone apparatus, the in-line adapter including a variable impedance and means for changing the impedance of the variable impedance such that its magnitude at a predetermined frequency greater than zero varies in response to the telephone apparatus transitioning between an on-hook state and an off-hook state, the telephone adapter device including a telephone adapter unit for converting POTS signals into corresponding digital signals suitable for transmission over a digital connection (such as a digital subscriber line) and a detector for detecting the change in impedance of the variable impedance of the first part via the pair of conductors and for determining that such a detected change in impedance corresponds to a telephone apparatus connected to the pair of conductors changing its state between an on-hook state and an off-hook state.

The telephone adapter of the third aspect of embodiments of the present invention can be incorporated into a DSL modem. This may be the user side DSL modem or a network side DSL modem depending on which basic scenario is being adopted. In some implementations, the user device (e.g. a BT home hub) may be provided with a separate DSL modem (e.g. a VDSL modem). In such a case, the hub device may perform routing and user interface functions, etc. In such an arrangement, it is preferable for the modem to include the telephone adapter since the hub device need not actually be connected to the extension wiring directly and so cannot itself provide telephone adapter functions to any telephone devices connected to the existing extension wiring without directly connecting the hub device to the extension wiring via a suitable connector.

Note that the terms on-hook and off-hook stem from a time when this status was determined by whether or not a telephone handset was actually resting on a "hook" or not. However naturally in modern day telephones the telephone need not have any such "hook" and the on-hook/off-hook state may be changed simply by pressing a button or by some other user-interface action. Nonetheless this terminology continues to be used to indicate a change in state of the telephone which is used for determining if an incoming call should be answered, or if dialling tone should be presented to the telephone, etc. and this is the sense in which this terminology is employed in the present application.

Further aspects of the present invention relate to methods of operating a user modem to provide data and telephony services as set out in the claims and to processor implementable instructions for carrying out such methods and to a carrier medium, most preferably a tangible carrier medium such as a magnetic or optical disk or a solid state storage device, etc., carrying such processor implementable instructions.

BRIEF DESCRIPTION OF THE DRAWINGS

In order that the present invention may be better understood, embodiments thereof will now be described, with reference to the accompanying drawings in which.

DETAILED DESCRIPTION OF A FIRST EMBODIMENT OF THE INVENTION

Figure 1:
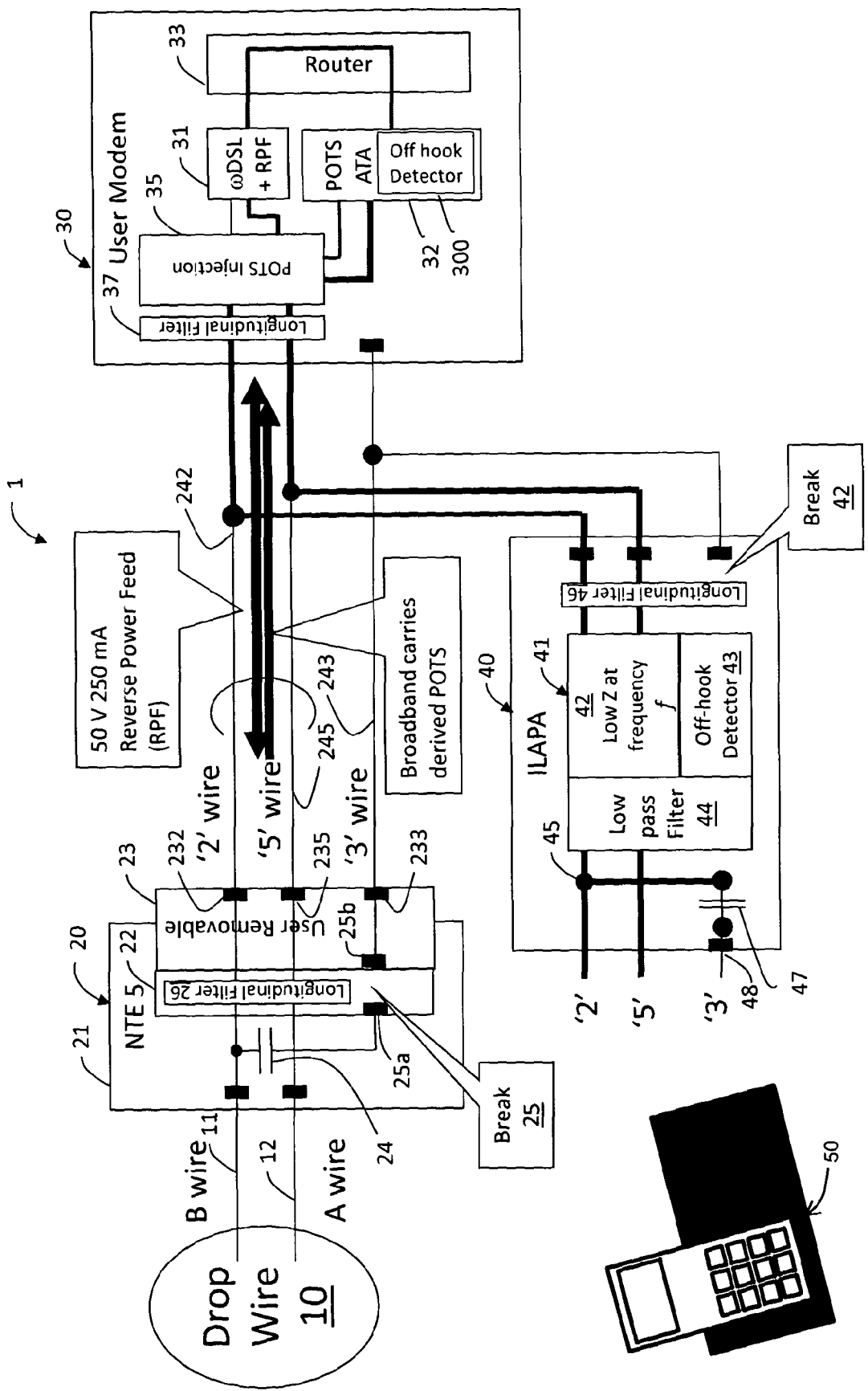
FIG. 1 is a schematic block diagram of a telephone on-hook/off-hook state communication system incorporating a reverse power feed to a network device according to a first embodiment of the present invention.

Referring now to FIG. 1, a two wire solution system 1 for providing telephony and data services to a user's home premises includes a reverse power feed (RPF—see the ωDSL and RPF module 31 within the user modem unit 30) which is supplied from the user's modem 30 to a network modem (not shown in FIG. 1). The system 1 includes in this example a drop wire 10 forming part of an access network provided by a telecommunications service provider such as British Telecommunications (BT) within the United Kingdom. The drop wire comprises a pair of wires known as the B wire 11 and the A wire 12.

The drop wire 10 is terminated within the user's premises by a network termination element 20 (such as the well known NTE 5 master socket device (in the UK)—as shown in FIG. 1). The network termination element 20 (in this case it is a conventional NTE 5) comprises a main body 21 and a user removable portion 23. In the present embodiment, an interstitial plate 22 has been inserted (conveniently this can be done by a user if the plate is configured to include an aperture as in GB2445212, the contents of which are incorporated herein by way of reference). In the present case, however, the electrical function of the interstitial plate is merely to isolate the 3 wire connection point 233 of the NTE 5 (specifically the user removable portion 23 thereof) from the incoming B wire of the drop wire 10. This is done by ensuring that there is a large resistance 25 between the original connection point 25*a* on the main portion of the NTE 5 and the corresponding connection point 25*b* on the interstitial plate. This can be done simply by not providing a conductive connection between these two points as indicated by the "break" 25 in FIG. 1. It should be noted that the break is on the user side of the capacitor 24. The capacitor 24 is the normal capacitor provided in an NTE 5 which enables the 3 wire within the user's exchange wiring to act as a bell wire which can cause on old telephone to ring when a ringing signal is sent over the drop wire, but which will not generate undesirable "tinkles" when other signals are sent over the A and B wires of the drop wire 10. This break 25 in the user installed interstitial plate 22 of the present embodiment isolates the 3 wire totally from the drop wire 10 throughout the user's premises—including in any extension sockets etc. (note that alternative NTE devices (e.g. for use in countries other than the UK) might not use a bell wire and might therefore simply connect the incoming A and B wires (or equivalents) directly through to the output pins (corresponding to 232 and 235 the 2 and 5 wire connection points respectively in FIG. 1) of the NTE device).

The interstitial plate 22 additionally provides a longitudinal filter 26. This corresponds to similar longitudinal filters 36 and 46 contained in the user modem 30 and the In-Line Analog POTS Presentation Adapter (ILAPA) 40 respectively. Together, the filters 26, 36, 46 ensure that the conductors carrying the DSL signals are well balanced. The NTE 5 (and the ILAPA 40 discussed below) may additionally contain other components to improve the performance of the system and to provide protection against surges etc—for example surge protection resistors and breakdown diodes, etc. but these are not discussed further (except in relation to the ILAPA where they are explicitly shown and briefly described) since they are not greatly pertinent to the present invention).

As in the case in GB2445212, the interstitial plate 22 includes an NTE side which couples to the NTE 5 main body 21 in place of the user removable portion 23 and includes an interface which mechanically corresponds to the interface provided by the main portion 21 into which the user removable portion 23 may couple instead of into the main portion 21. The user removable portion 23 also provides an interface (or socket) into which a jack associated with a connector (having conductors or wires 232, 233 and 235) may be plugged. This interface together with the electrical connections from the interface to the drop wire 10 corresponds to the connector portion of the termination unit and it is apparent that the connector portion is modified from the conventional connector portion of a conventional NTE 5 only in that the '3' wire connection part of the user removable portion 23 is no longer coupled to the B wire 11 of the drop wire 10 via a capacitor 21 because of the resistance or break 25.

The user removable portion 23 also provides a convenient connector portion to which extension wiring may be connected (again see GB2445212 for details). Since this is electrically connected to the user removable portion 23, the '3' wire of all such extension wiring is also isolated from the B wire 11 rather than being connected to it via a capacitor as in the conventional arrangement. In FIG. 1, the wires 242, 245 and 243 may be thought of as extension wiring connecting the master socket to an extension socket (not shown), the wires corresponding to the '2' wire, the '5' wire and the '3' wire of the extension wiring respectively.

The system 1 further includes a user modem 30. As shown, the user modem 30 includes a DSL transceiver and Reverse Power Feed (RPF) unit 31. The DSL transceiver unit is labelled as an ωDSL transceiver to indicate that it can be any type of high bandwidth DSL modem such as a VDSL modem, etc. Its precise functioning is not relevant to the present invention and so will not be described further herein except to state that it is capable of providing a Reverse Power Feed (RPF) to a remote network modem unit in a known manner. In the present case, the RPF provides a 50V DC voltage which is capable of supplying up to 250 mA (or up to 12.5 Watts of electrical power) to the remote modem.

The modem 30 also includes a router 33 and a POTS Analog Telephone Adapter (ATA) 32. The Router unit 33 may be conventional in operation and is not described further herein. Additionally, the POTS ATA unit 32 can be largely conventional in operation except that unlike with conventional ATA units, ATA 32 includes an on-hook/off-hook detector 300 which is described in greater detail below with reference to FIG. 3. Additionally, instead of being connected directly to the 2 wire and 5 wire of the extension wiring (or equivalently to the B and A wire of the drop wire) it is connected to these wires via a POTS injection module 35 which, in the present embodiment, isolates the ATA from DC signals since these would be confused by the reverse power feed.

As is explained in greater detail below with reference to FIG. 3, the on-hook/off-hook detector 300 operates to detect a change in the impedance of a variable impedance contained in the ILAPA 40 (the construction of which is shown in greater detail in FIG. 4) via the pair of conductors 242, 245 (i.e. the "2" and "5" wires in the extension wiring between the ILAPA 40 and the user modem 30). In the present embodiment, this is done (as is explained in greater detail below) by providing an AC signal at a predetermined frequency (in the present case at 16 kHz to be synchronous with telephony sampling, but any frequency generally between the POTS voice band and the DSL band would be appropriate—8 kHz could also be chosen to be synchronous with telephony voice sampling) and then using a transformer to detect the current flowing in series with the signal source. By blocking DC signals in the detection circuit an increased current at the predetermined frequency can be detected at the transformer's secondary winding, and by rectifying the signal and then low pass filtering it and then comparing it with a reference voltage a change in impedance at the ILAPA can be detected. When the detected, rectified and integrated signal from the secondary exceeds the reference voltage, it can be deduced that the telephone device 50 has moved into an off-hook state in which the impedance at the predetermined frequency has been reduced to allow a greater AC current to flow through the transformer than when the telephone apparatus is in its on-hook state.

In FIG. 1, the user modem 30 corresponds to and is representative of the claimed "second part" and the ILAPA corresponds to and is representative of the claimed "first part". In the present embodiment, a DC output is generated by the on-hook/off-hook detector (and by appropriately connecting this output signal to the ATA can be arranged) such that it looks to the ATA just like a conventional DC on-hook/off-hook signal, such that no modification is required to the ATA, however it would of course be possible to use a different mechanism for signalling from the on-hook/off-hook detector to the ATA if modifications were made to the ATA to accept such alternative signalling.

Turning now to the ILAPA 40, this performs a number of functions in order to enable an analog device 50 (e.g. telephone apparatus 50) to be connected to the system 1 via the ILAPA 40. One function it performs is to isolate the "3" wire 243 (the bell wire) from the analog device 50 by providing a break or resistance 42. Embodiments of the present invention represent a two wire solution in which only two wires are required for carrying all of DSL signals, POTS signals and a reverse power feed. Thus the bell wire is not required and we therefore simply disconnect it when this solution is implemented in a typical UK residential set-up; of course, in other setups (e.g. in other countries) there might not be any such third wire equivalent to the UK bell wire and in that case there would be no need to provide such a "disconnection", etc. The incoming "2" and "5" wires 242 and 245 are connected through a longitudinal filter 46 which is similar to the longitudinal filter 26 contained in the interstitial plate 22 discussed above, to a circuit 41 which, from a functional perspective, includes a "variable impedance" portion 42, an off-hook detector portion 43 (which represents a means for varying the impedance of the variable impedance portion 42 in the present embodiment) and a low pass filter portion 44. The low pass filter portion 44 simply performs the standard functionality provided by a DSL filter of filtering out the unwanted DSL signals from the POTS signals to/from the telephone apparatus (though in the present embodiment, it is additionally adapted to filter out signals at frequency f to avoid these causing problems at the telephone apparatus. The on-hook/off-hook detector portion 42 detects when the telephone apparatus 50 transitions between an on-hook and off-hook state. In the present embodiment this is done by a relay which is switched on when additional current is drawn as a result of the telephone apparatus providing a low resistance when in its off-hook state compared to in its on-hook state, but alternative methods could be used to achieve this function. The variable impedance portion 42 includes an LC (Inductor Capacitor) combination which is switched into the circuit by the relay and which reduces the impedance presented to the AC signal arriving at the ILAPA 40 from the on-hook/off-hook detector 300 of the ATA 32 of the user modem 30 via the "2" and "5" wires 242, 245 when the telephone apparatus 50 moves into its off-hook state. Additionally, the ILAPA 40 contains a capacitor 47 which corresponds to the capacitor 24 found in the NTE 5 device which is used to generate a Bell wire signal from the incoming B wire 11—note the capacitor 47 performs the same function of converting the signal on the "2" wire into an appropriate signal for driving the "bell wire" connected to the '3' wire connection point 48 in the ILAPA 40 in order to enable the telephone 50 to operate correctly if it relies upon the "bell wire" for its ringing behaviour.

Second Embodiment

Figure 2:
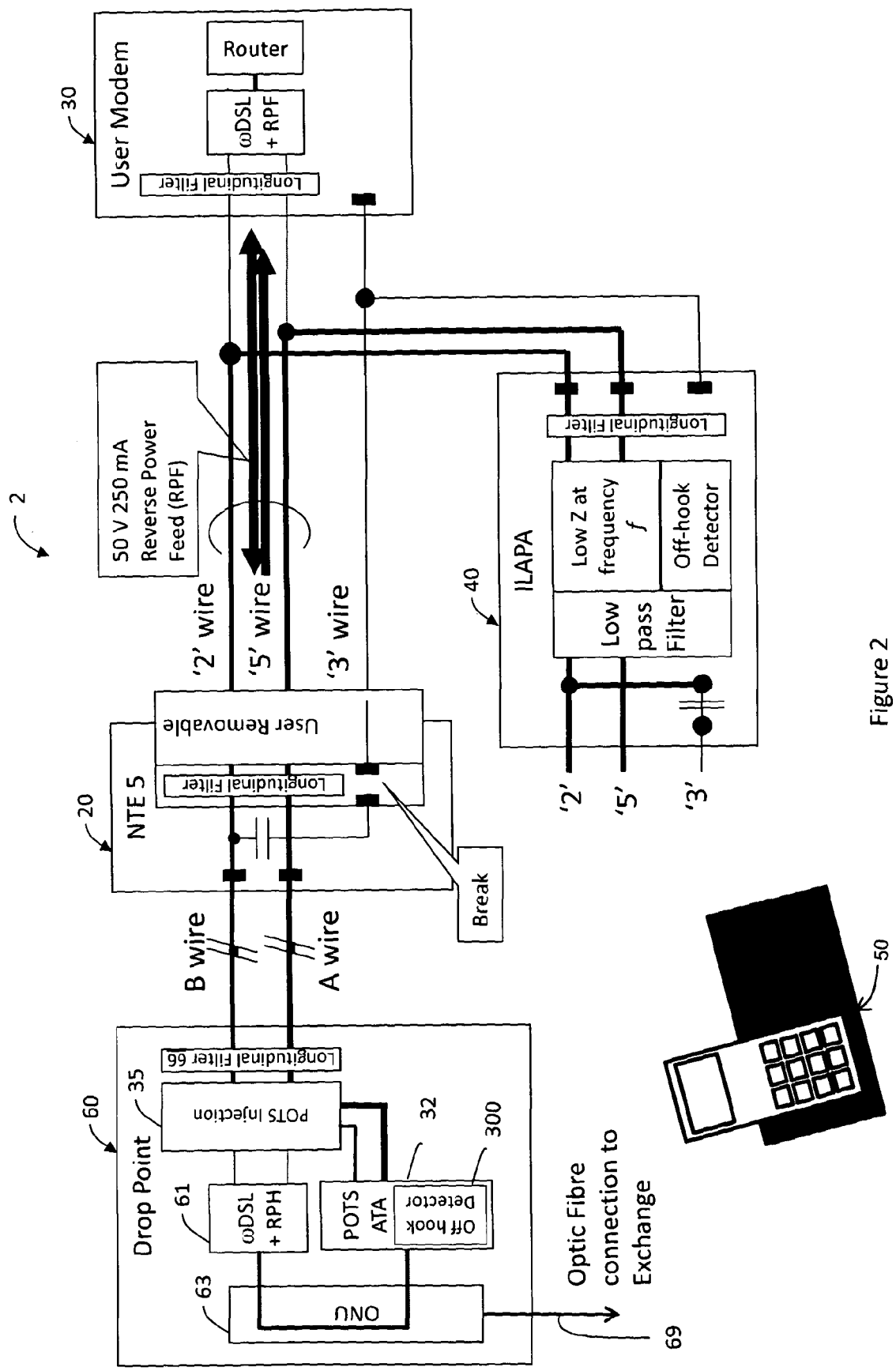
FIG. 2 is a schematic block diagram of a telephone on-hook/off-hook state communication system incorporating a reverse power feed to a network device according to a second embodiment of the present invention.

Referring now to FIG. 2, a second embodiment in which an alternative 2 wire solution is illustrated. The system 2 is very similar to the system 1 and like reference numerals have been used to indicate like elements. The main difference is that the ATA 32 (including off-hook/on-hook detector 300) is now located not in the user modem 30, but in a drop point 60, together with the POTS injection module 35. The NTE device 20 and the ILAPA 40 are exactly the same as in the first embodiment and will not be further discussed.

Apart from the ATA 32, the other components in the drop point 60 are conventional for a reverse power fed network wDSL modem and back haul arrangement 63,69. Thus, the drop point 60 includes a high bandwidth modem component 61 (it will additionally include more of these for any other similar drop lines aggregated at the drop point 60) which is notable for including a Reverse Power Harvesting function (RPH) which can harvest power from the drop pair fed onto the drop pair by the user modem 30. The drop point also includes an Optical Network Unit (ONU) 63 which communicates with a local exchange via an optic fiber connection 69; the ONU is shared by all ωDSL modems contained in the drop point 60. The drop point also includes a set of longitudinal filters including longitudinal filter 66 for each drop pair aggregated at the drop point 60. The various components may all be incorporated into a single piece of equipment at the drop point or they may be kept as separate devices according to which arrangement is most convenient for a particular drop point.

On-Hook/Off-Hook Detector and Ilapa Circuitry

Figure 3:
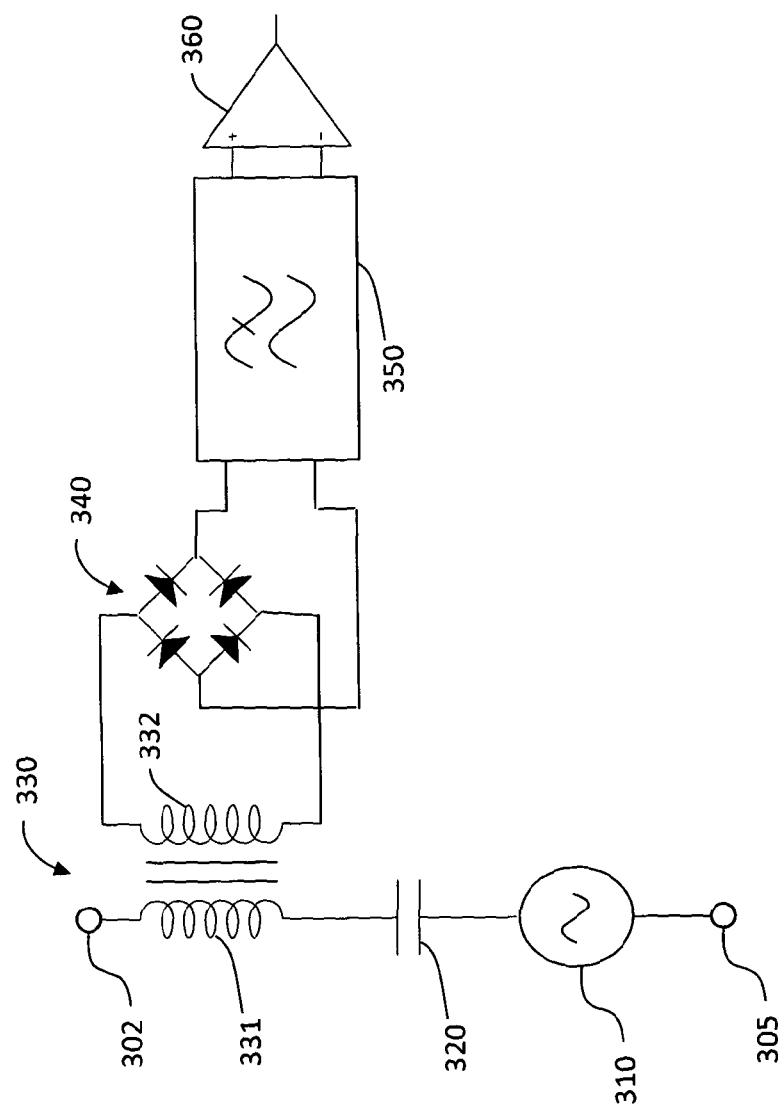
FIG. 3 is a schematic block diagram of an on-hook/off-hook detector included in the analog telephone adapter part of the systems of FIGS. 1 and 2.
Figure 4:
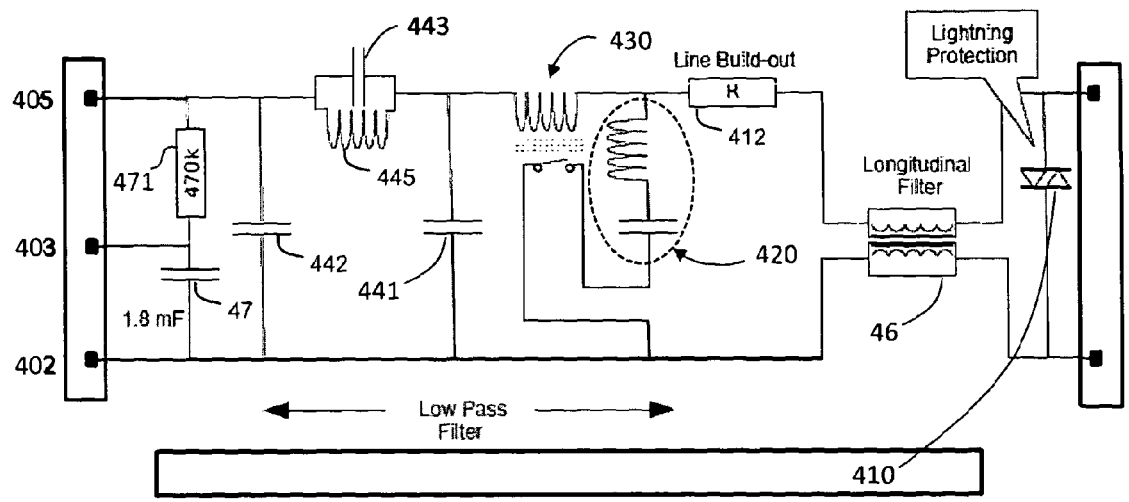
FIG. 4 is a schematic block diagram of the In-Line Analog POTS presentation Adapters including a variable impedance whose impedance varies in dependence upon the on-hook/off-hook state of an attached telephone apparatus as shown in the systems in FIGS. 1 and 2, but illustrated in more detail.
Figure 5:
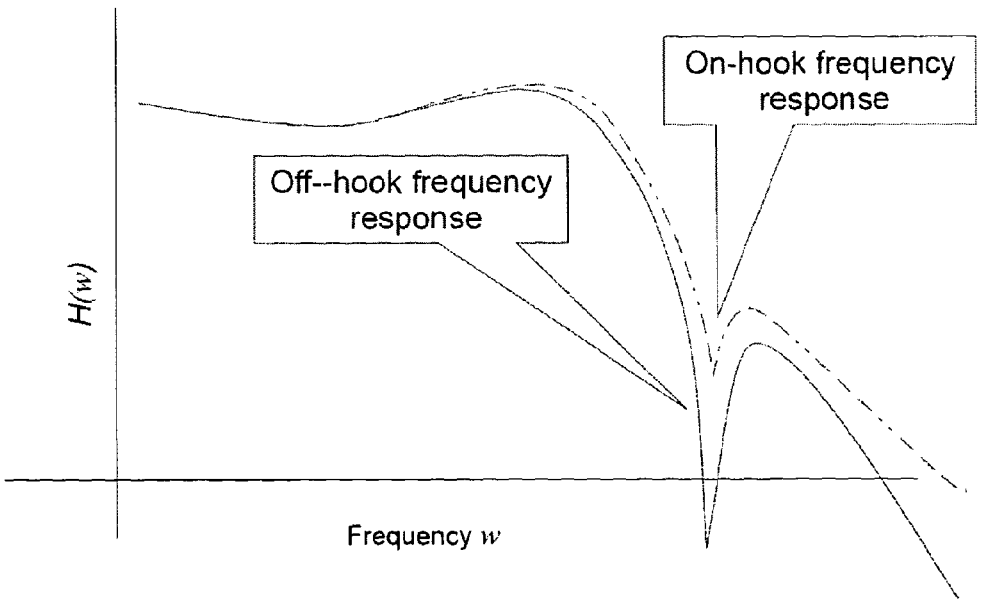
FIG. 5 is a schematic view of the different frequency response characteristics of the ILAPA of FIG. 4 when an attached telephone is in the off-hook and on-hook states from the perspective of the attached telephone apparatus.

Referring now to FIGS. 3, 4 and 5, the specific implementations of the on-hook/off-hook detector 300 and the ILAPA 40 as used in the first and second embodiments illustrated in FIGS. 1 and 2 are now described.

Thus, as shown in FIG. 3, the on-hook/off-hook detector 300 (which forms a part of the ATA 32) includes a pair of connection points 302, 305 (for connection to the "2" and "5" wires respectively (via the POTS injection module 35), an AC signal source 310, a capacitor 320, a transformer 330 which includes a primary winding 331 and a secondary winding 332, a full-wave rectifier 340, a low pass filter 350 and a comparator 360. when the circuit is connected to the 2 and 5 wires via the POTS injection module 35, the amount of current which passes through the transformer 330 depends upon the total impedance presented by the circuit which includes the ILAPA 40 as well as on the impedance presented by the transformer 330 and the capacitor 320. As shown in FIG. 5, the ILAPA frequency response is chosen to move between a non-zero value at frequency f (=16 kHz in the present embodiment as discussed above) and a substantially zero value at f when the telephone apparatus 50 is detected as moving into an off-hook state (FIG. 5 actually shows the transfer function H(ω) from the perspective of the attached telephone, but it is clear from this that there is a dip in the transfer function at frequency f and moreover it is clear that the dip is lower (to zero) when the telephone is in the off-hook state—this is caused by the switching in of a lower impedance (at f) LC combination which offers little impedance to signals at f so they do not make it to the far side of the filter and so it results in a low transfer of the filter at this frequency). The transformer 330 and capacitor 320 are also chosen to have a similar low impedance at f—in this way the signal transferred to the secondary winding 332 will be greatest when the ILAPA is in its low impedance state (from the perspective of the detector 300) as obtained when the telephone apparatus moves into its off-hook state. At this point, the fully rectified signal from the full wave rectifier 340 is low pass filtered by the low pass filter 350 to obtain the approximate DC average component of the signal after rectification and this is compared with a reference voltage $v_{ref}$ by the comparator 360. The voltage $v_{ref}$ is chosen such that the detector 300 can easily discriminate between the telephone apparatus (or any one of several telephone apparatuses) going into the off-hook state from the on-hook state, even if several telephone apparatuses (or equivalent apparatuses such as fax machines, etc.) are connected to the ATA 32 via a number of different ILAPA's connected around a user's premises.

The ILAPA 40, as shown in more detail in FIG. 4, includes a lightening protector 410 (formed here by a pair of breakdown diodes which allow current to flow in either direction in the event of high surge voltages occurring across the input terminals) a longitudinal filter 46 (discussed above) to balance the port of the ILAPA to the extension wiring at DSL frequencies, a line build-out resistor 412 to limit the current taken by the ILAPA when the telephone apparatus 50 goes off-hook, a low impedance at f LC pair 420 and a relay 430 (the low impedance at f LC pair 420 is switched into the circuit by the relay 430 when the telephone 50 goes off-hook), a series of filter components including capacitors 441, 442, 443, and inductor 445, and a resistor 471 and capacitor 47 which emulate the bell wire functionality to the bell wire output 403.

The series LC impedance elements 441,442,443,445,420, 430 (which can be thought of as forming a variable impedance) can be implemented as part of the DSL low pass filter 40 providing an out of band transmission zero in a POTS band low pass filter. The effect of the AC low impedance block is apparent in the frequency response of the filter (from the perspective of the attached telephone apparatus 50 as shown in FIG. 5). On-hook, a single zero is evident, due to the parallel LC section 443,445 in series, and when the off-hook detection causes the low impedance 420 to be switched in, a second transmission zero increases the attenuation at the off-hook sensing frequency f. The graphs in FIG. 5 are not derived from any specific design, but are indicative of the principles involved.

When the telephone apparatus connected to output connection points 405 and 402 goes off-hook it presents a low resistance across these connection points. This causes the relay 430 to close and the low impedance at f 420 is switched into the circuit. The line build-out resistor 412 prevents the telephone apparatus from drawing too much current in this state. The low impedance at f component 420 offers little impedance to the signal generated by the signal source in the detector and so a large voltage is generated at the comparator 360 which thus generates a DC voltage and current at the output of the comparator which is detected at the ATA as equivalent to the DC signal that would normally be generated by the telephone apparatus drawing current from the local exchange battery voltage applied to the drop pair at the exchange.

In summary, conventionally a telephone apparatus signals an off hook condition to the network by applying a low impedance across the drop pair, causing a DC current to flow from the battery feed when the handset of the telephone is picked up, which flow is detected by the network to indicate that the telephone is off hook.

When a DC reverse power feed is employed on the same pair, this form of signalling does not work since the network (or ATA) cannot differentiate between the on-hook and off-hook telephony states.

In the alternative approach of the present embodiments therefore, instead of relying on a DC battery source from the exchange (or an ATA), a sine-wave source is used, and the telephone instead of applying a low impedance at DC applies (via an ILAPA) a low impedance at the sine wave frequency. An off-hook state can now be detected by observing current flowing at the sine-wave source at the sine-wave frequency.

As a note on the wiring numbering, the use of terms such as '2' wire, '5' wire etc. stems from the use of registered jacks such as RJ11 which typically provide 6 connection points for up to three pairs of wires running within a connector fitted with an RJ at at least one end thereof. It is common in telephony wiring for connectors to be used which carry 4 wires and these are typically wired up to the RJ such that connection points 3 and 4 are connected to one pair of wires and connection points 2 and 5 are connected to another pair of wires. Usually just one of these pairs of wires is used to carry signals although in the UK it is common for wires 2 and 5 to carry the telephone signals coming from the incoming A and B wires while the 3 wire is used as the Bell wire.

The invention claimed is:

1. A telephone on-hook/off-hook state communication system comprising:
   a first part operable to interconnect between a telephone apparatus and a pair of conductors;
   a second part operable to interconnect between the pair of conductors and a telephone adapter unit; and
   a reverse power feed arrangement for transmitting power over the pair of conductors from a user's premises to an item of equipment located within a part of a packet based access network external to the user's premises, the first part including a variable impedance and means for changing the impedance of the variable impedance such that a property of the impedance at a predetermined frequency greater than zero changes in response to the telephone apparatus transitioning between an on-hook state and an off-hook state, the second part including a detector for detecting the change in the impedance of the variable impedance of the first part via the pair of conductors, wherein the second part is incorporated into the same device as the telephone adapter unit, the telephone adapter unit being operable to convert Plain Old Telephone Service signals to and from Voice over Internet Protocol signals for transmission over and reception from the access network
   wherein the second part is operable to interconnect between the pair of conductors and the telephone adapter unit without forming an interconnecting break between the first part and the item of equipment.

2. The system of claim 1 wherein the first part is a modular interface device for receiving and transmitting telephony signals to and from the telephone apparatus via a lead including two conductors.

3. The system of claim 1 wherein the pair of conductors between the first and second parts are either part of or are in direct connection with telephone extension wiring within a user's premises.

4. The system of claim 1 wherein the telephone adapter unit is located within a user modem device.

5. The system of claim 1 wherein the telephone adapter unit is located within a network modem device which is located in an aggregation point and forms part of an access network.

6. An interface device for use in the system of claim 1 as the first part thereof, the interface device being operable to interconnect between a telephone apparatus and a pair of conductors to which a second part of the system of any one of the preceding claims may be connected, the second part being operable to interconnect between the pair of conductors and an analog telephone adapter unit, the interface device including:
- a variable impedance;
- means for changing the impedance, of the variable impedance, at a predetermined frequency greater than zero, by an amount which is detectable by the second part, the change in impedance being effected in response to the telephone apparatus transitioning between an on-hook state and an off-hook state; and
- a line build-out resistor to limit the current taken by at least one of the interface device or the telephone apparatus when the telephone apparatus transitions to an off-hook state.

7. A telephone adapter device, which device is suitable for use in the system of claim 1 as the second part thereof, the telephone adapter device being operable to connect to a pair of conductors which in turn may be connected, when in use, to an interface device forming a first part of the system of claim 1, the interface device being in turn connectable to a telephone apparatus within a user's premises, the interface device including:
- a variable;
- a controller for changing the impedance of the variable impedance such that its magnitude at a predetermined frequency greater than zero varies in response to the telephone apparatus transitioning between an on-hook state and an off-hook state;
- a telephone adapter unit included in the telephone adapter device, for converting Plain Old Telephone Service signals into corresponding digital signals suitable for transmission over a digital connection within a packet based access network; and
- a detector for detecting the change in impedance of the variable impedance of the first part via the pair of conductors and for determining that such a detected change in impedance corresponds to a telephone apparatus connected to the pair of conductors changing its state between an on-hook state and an off-hook state, wherein the telephone adapter device is located within a part of a packet based access network external to the user's premises and is operable to be powered by power harvested from the pair of conductors onto which power is transmitted by a reverse power feed arrangement for transmitting power over the pair of conductors from the user's premises.

8. A method comprising:
communicating the on-hook/off-hook state of a telephone apparatus over a pair of conductors between a first part operable to interconnect between the telephone apparatus and the pair of conductors and a second part operable to interconnect between the pair of conductors and a telephone adapter unit, wherein the pair of conductors additionally carry power transmitted by a reverse power feed arrangement from a user's premises to an item of equipment located within a part of a packet based access network external to the user's premises, wherein the second part is operable to interconnect between the pair of conductors and the telephone adapter unit without forming an interconnecting break between the firstpart and the item of equipment;
changing the impedance of a variable impedance in the first part such that a property of the impedance at a predetermined frequency greater than zero changes in response to the telephone apparatus transitioning between an on-hook state and an off-hook state; and
detecting the change in the impedance of the variable impedance of the first part via the pair of conductors at the second part, wherein the second part is incorporated into the same device as the telephone adapter unit, and wherein the telephone adapter unit converts Plain Old Telephone Service signals to and from Voice over Internet Protocol signals for transmission over and reception from the access network.

\* \* \* \* \*